(12) United States Patent
Guérin et al.

(10) Patent No.: US 11,794,761 B2
(45) Date of Patent: Oct. 24, 2023

(54) USER INPUT SIGNAL MANAGEMENT IN A VEHICLE TO SELECTIVELY LIMIT THE PRIME MOVER ROTATIONAL SPEED

(71) Applicant: TRANSMISSION CVTCORP INC., Sainte-Julie (CA)

(72) Inventors: Jonathan Guérin, Sainte-Julie (CA); Daniel Girard, Saint-Mathieu-de-Beloeil (CA)

(73) Assignee: TRANSMISSION CVTCORP INC., Ste-Julie (CA)

( * ) Notice: Subject to any disclaimer, the term of this patent is extended or adjusted under 35 U.S.C. 154(b) by 51 days.

(21) Appl. No.: 17/593,980

(22) PCT Filed: May 1, 2020

(86) PCT No.: PCT/CA2020/050579
§ 371 (c)(1),
(2) Date: Sep. 29, 2021

(87) PCT Pub. No.: WO2020/223796
PCT Pub. Date: Nov. 12, 2020

(65) Prior Publication Data
US 2022/0169271 A1 Jun. 2, 2022

Related U.S. Application Data

(60) Provisional application No. 62/842,573, filed on May 3, 2019.

(51) Int. Cl.
*B60W 50/12* (2012.01)
*B60W 10/02* (2006.01)
(Continued)

(52) U.S. Cl.
CPC ............ *B60W 50/12* (2013.01); *B60W 10/02* (2013.01); *B60W 10/06* (2013.01);
(Continued)

(58) Field of Classification Search
CPC .... B60W 10/02; B60W 10/06; B60W 10/101; B60W 30/188; B60W 50/12;
(Continued)

(56) References Cited

U.S. PATENT DOCUMENTS

| 6,066,070 A | 5/2000 | Ito et al. |
| 7,937,201 B2 * | 5/2011 | Roudeau ......... B60W 30/18109 |
| | | 701/87 |

(Continued)

FOREIGN PATENT DOCUMENTS

| WO | 2015/106350 A1 | 7/2015 |
| WO | 2018/112620 A1 | 6/2018 |

*Primary Examiner* — Edwin A Young
(74) *Attorney, Agent, or Firm* — Fay Kaplun & Marcin, LLP (57) ABSTRACT

A user input signal management method for a vehicle provided with a prime mover having an output that rotates and an input for a user input signal that controls the rotating speed of the output of the prime mover. The method including the reception of a signal representative of the position of a user input of a vehicle, the reception of data representative of at least one condition of the vehicle, the modification of the received signal representative of the position of the user input as a function of the data received and the supply of the modified signal to the accelerator input of the prime mover.

20 Claims, 4 Drawing Sheets

(51) Int. Cl.
  *B60W 10/06* (2006.01)
  *B60W 10/101* (2012.01)
  *B60W 30/188* (2012.01)

(52) U.S. Cl.
  CPC ......... *B60W 10/101* (2013.01); *B60W 30/188* (2013.01); *B60W 2510/0241* (2013.01); *B60W 2510/0275* (2013.01); *B60W 2510/0638* (2013.01); *B60W 2510/1005* (2013.01); *B60W 2520/28* (2013.01); *B60W 2540/00* (2013.01); *B60W 2710/027* (2013.01); *B60W 2710/0644* (2013.01); *B60W 2710/1005* (2013.01)

(58) Field of Classification Search
  CPC . B60W 2510/0241; B60W 2510/0275; B60W 2510/0638; B60W 2510/1005; B60W 2520/28; B60W 2540/00; B60W 2710/027; B60W 2710/0644; B60W 2710/1005
  See application file for complete search history.

(56) References Cited

U.S. PATENT DOCUMENTS

| | | | |
|---|---|---|---|
| 9,663,093 B2 * | 5/2017 | Kaneko | B60T 8/3215 |
| 2005/0026747 A1 * | 2/2005 | Steen | B60W 10/02 |
| | | | 477/78 |
| 2009/0163319 A1 | 6/2009 | Janasek | |
| 2017/0167403 A1 * | 6/2017 | Ryu | F02M 35/104 |

* cited by examiner

USER INPUT SIGNAL MANAGEMENT IN A VEHICLE TO SELECTIVELY LIMIT THE PRIME MOVER ROTATIONAL SPEED

FIELD

The present disclosure generally relates to a user input in a vehicle. More specifically, the present disclosure is concerned with the management of the user input control signal in a vehicle to selectively limit the prime mover rotational speed.

BACKGROUND

Conventional vehicle user controls are usually provided with a user input, often in the form of an accelerator pedal, used to increase or decrease the vehicle speed by increasing or decreasing the rotational speed of the output of the prime mover of the vehicle. Generally, the accelerator pedal generates a control signal representative of its position and supplies this signal to an input of the prime mover that controls the rotational speed of its output as a function of the control signal received.

While this system is acceptable in many applications, it is not perfect since the user may try to increase the vehicle speed, therefore the rotational speed of the output of the prime mover, when it is not adequate to do so or when it decreases the overall efficiency of the drivetrain.

Figure 1:
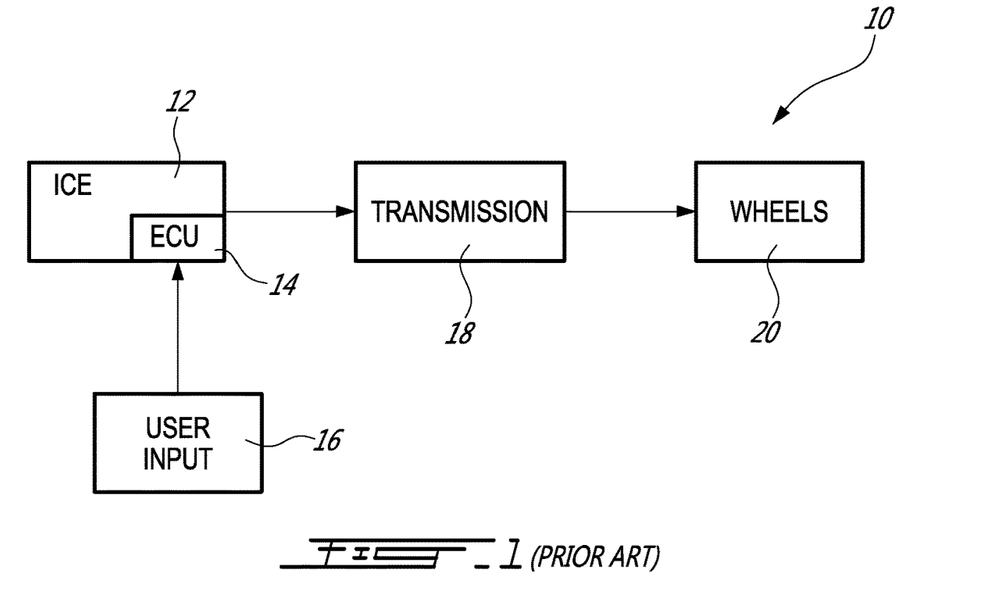
FIG. 1, which is labeled "Prior Art" is a bloc diagram schematically illustrating a typical drivetrain of a vehicle.

FIG. 1, which is labelled prior art, schematically illustrates a conventional drivetrain 10 provided with a prime mover in the form of an Internal Combustion Engine (ICE) 12 having an Engine Control Unit (ECU) 14 that receives a control signal from a user input 16, for example an accelerator pedal. The ICE 12 includes an output shaft that is connected to the input of a transmission 18, the output of which is driving the wheels 20. In such a conventional drivetrain 10, the speed of rotation of the shaft of the ICE 12 is a function of the position of the user input 16. This type of arrangement makes it possible for the shaft of the ICE to rotate at very high speed even when this is not required or even advisable to do so.

DETAILED DESCRIPTION

An object is generally to provide an improved user input control signal management in a vehicle. More specifically, the present disclosure generally relates to an architecture allowing the rotational speed of the prime mover to be limited to a maximal value, i.e., clipped, in specific conditions, notwithstanding the control signal coming from a user input (referred herein as an accelerator pedal).

According to an illustrative embodiment, there is provided a user input signal management method for a vehicle provided with a drivetrain including prime mover having an output that rotates and an input for a user input control signal that controls the rotating speed of the output of the prime mover, the method including: receiving a control signal representative of the position of a user input of a vehicle; receiving data representative of at least one condition of the vehicle; generating a max point signal as a function of the data received; determining the lesser of the control signal and the max point signal; and supplying the lesser signal to the input of the prime mover.

According to another illustrative embodiment, there is provided a user input signal management method for a vehicle provided with a drivetrain including a prime mover having an output that rotates and an Engine Control Unit (ECU) having first and second inputs, the method including: supplying a signal representative of a position of a user input of a vehicle to the first input of the ECU; receiving data representative of at least one condition of the vehicle; generating a max point signal as a function of the data received; and supplying the max point signal to the second input of the ECU. Wherein the prime mover rotates its output at a speed that is a function of the lesser of the control signal and the max point signal.

According to another aspect, there is provided a drivetrain for a vehicle provided with a user input including an output so configured as to generate a control signal representative of the position of the user input, the drivetrain including: a prime mover provided with an output and with an Electronic Control Unit (ECU) having an input; the ECU being so configured as to rotate the output of the prime mover at a speed that is a function of a signal receive at the input thereof; a controller having an input connected to the output of the user input so as to receive the control signal therefrom, at least another input allowing vehicle condition data to be supplied to the controller; the controller being so configured as to generate a max point signal as a function of the vehicle condition data; the controller having an output connected to the input of the ECU of the prime mover; the controller being so configured as to supply the lesser of the control signal and the max point signal to the user input of the ECU.

According to yet another aspect, there is provided a drivetrain for a vehicle provided with a user input so configured as to generate a control signal representative of the position of the user input, the drivetrain including: a prime mover provided with an output and with an Electronic Control Unit (ECU) having a first and second inputs; the first input receiving the control signal from the user input; and a controller having at least one input allowing vehicle condition data to be supplied to the controller; the controller being so configured as to generate a max point signal as a function of the vehicle condition data; the controller supplying the max point signal to the second input of the ECU; the prime mover being so configured as to rotate the output at a speed that is a function of the lesser of the control signal and the max point signal.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

It is to be noted that the expression "prime mover" is to be construed herein and in the appended claims as an internal combustion engine a turbine engine, or any other mechanical power production element or assembly.

It is to be noted that the expression "Continuously Variable Transmission" or its abbreviation "CVT", is used herein to describe any type of CVT including, amongst others, a toroidal CVT, a dual-cavity full toroidal CVT, a half-toroidal CVT, a single cavity toroidal CVT, a hydrostatic CVT, a Variable diameter pulley CVT, a magnetic CVT, a ratcheting CVT, an electronic CVT and a cone CVT. It is also to be noted that the term "CVT" is also to be construed, herein and in the appended claims, as a CVT provided with further elements allowing it to operate as an IVT, standing for Infinitely Variable Transmission, a subset of CVT designs in which the range of ratios of output shaft speed to input shaft speed includes a zero ratio.

It is to be noted that the expression "overdrive" when used herein in the context of a CVT, is to be construed herein and in the appended claims as a condition where the CVT ratio is such that the CVT output speed is higher than the CVT input speed. The transmission ratio (of output speed to input speed) is therefore higher that one to one (1:1).

It is to be noted that the expression "underdrive" when used herein in the context of a CVT, is to be construed herein and in the appended claims as a condition where the CVT ratio is such that the CVT output speed is lower than the CVT input speed. The transmission ratio (of output speed to input speed) is therefore lower that one to one (1:1).

It is to be noted that the term "drivetrain", used herein and in the appended claims, are to be construed as the intervening mechanism by which power is transmitted from a prime mover to a final drive as well as this mechanism plus the prime mover.

The expressions "connected" and "coupled" are interchangeable and should be construed herein and in the appended claims broadly so as to include any cooperative or passive association between mechanical parts or components. For example, such parts may be assembled together by direct coupling or connection, or indirectly coupled or connected using further parts therebetween. The coupling and connection can also be remote, using for example a magnetic field or else.

The expression "gear ratio" should be construed herein and in the appended claims broadly as meaning the ratio between the speed of rotation at the input of a machine, system or assembly to that of the output thereof (input/output).

Other objects, advantages and features of the user input control signal management will become more apparent upon reading of the following non-restrictive description of illustrative embodiments thereof, given by way of example only with reference to the accompanying drawings.

Generally stated, the illustrative embodiments describe methods and architectures allowing the rotational speed of the output shaft of a prime mover to be limited to a maximal value in specific conditions that will be described hereinbelow, notwithstanding the control signal supplied by the user input.

Figure 2:
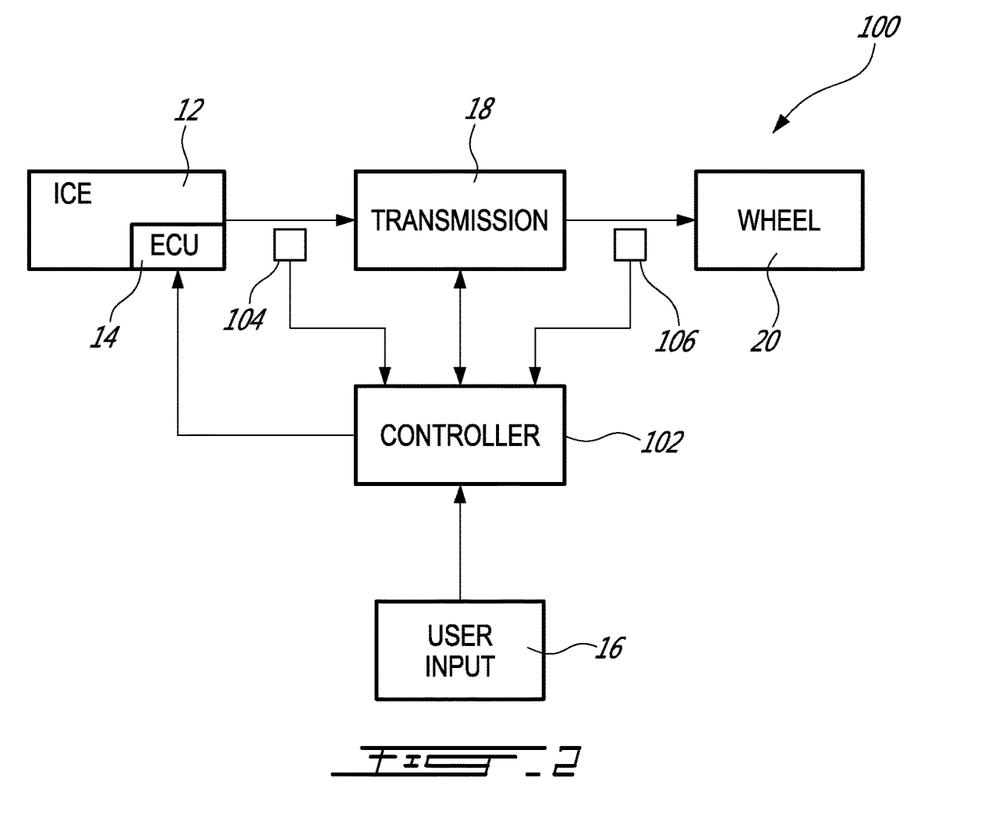
FIG. 2 is a schematic bloc diagram illustrating a drivetrain architecture according to a first illustrative embodiment allowing the management of the user input signal.

Turning now more specifically to FIG. 2 of the appended drawings, illustrating a drivetrain 100 according to a first illustrative embodiment. The drivetrain 100 includes the same ICE 12, ECU 14, user input 16, transmission 18 and wheels 20 as discussed in reference to FIG. 1.

The drivetrain 100 further includes a controller 102 to which the user input 16 is connected, a first speed sensor 104 measuring the rotational speed of the output shaft of the ICE 12 and a second speed sensor 106 measuring the rotational speed of the output shaft of the transmission 18. The controller 102 includes an input/output connection to the transmission 18, for example to let the controller 102 know that an element of the transmission 18 is slipping or is engaged. Finally, the controller 102 includes an output connected to the ECU 14 of the ICE 12 to supply user input control signal or modified user input signal data thereto, as will be described hereinbelow.

Figure 3:
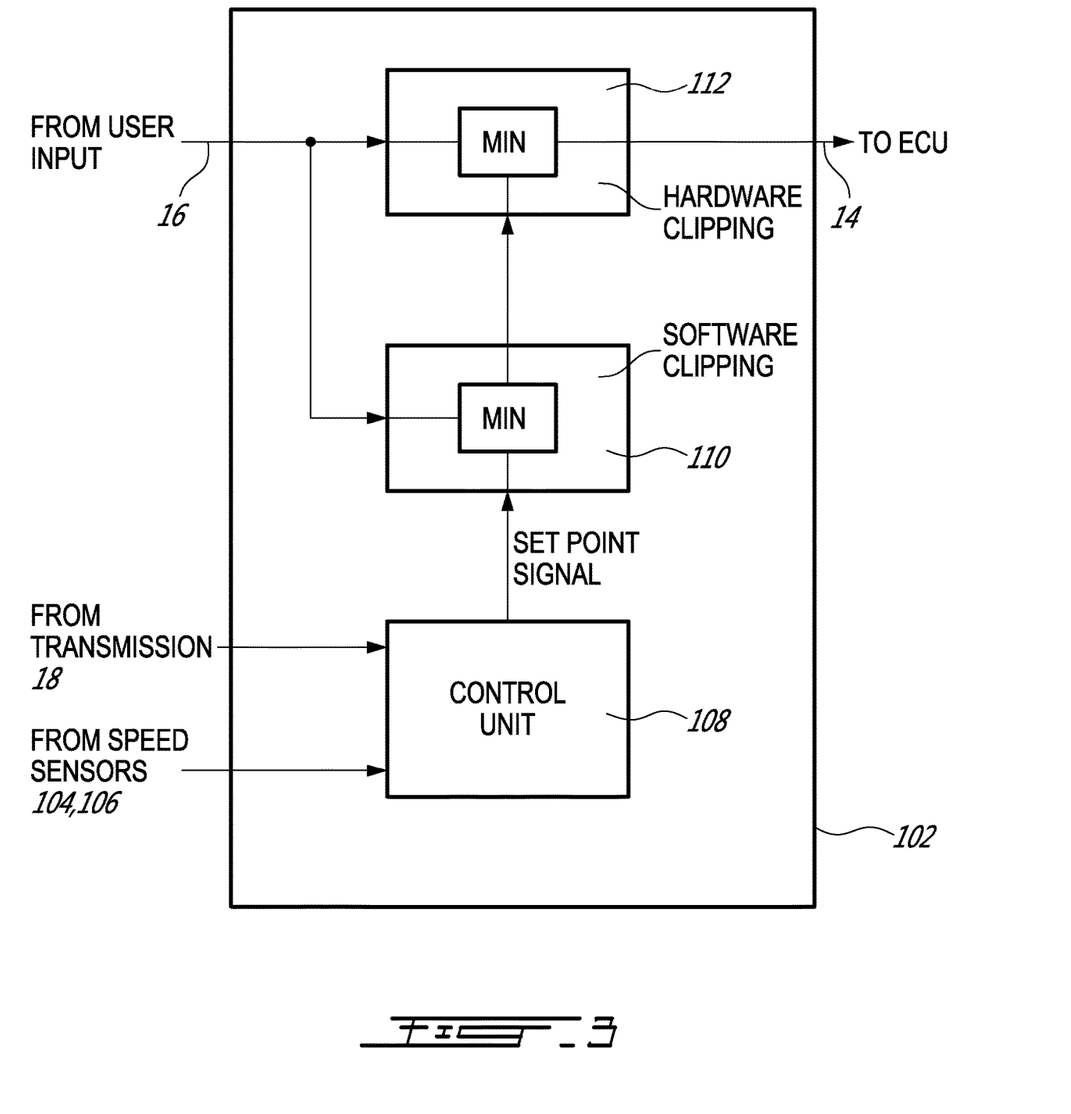
FIG. 3 is a schematic block diagram of the controller of the drivetrain architecture of FIG. 2.

FIG. 3 of the appended drawings illustrate the controller 102 in greater detail. As can be seen from this figure, the controller 102 includes a control unit 108 having inputs at least from the transmission 18 and the speed sensors 104 and 106, a software clipping module 110 and a hardware clipping module 112 both receiving the signal from the user input 16.

As a non-limiting example, for the following description of the operation of the controller 102, the signal from the user input 16 is a voltage varying from about 0.5 volts when the pedal is not depressed to about 4.5 volts when the pedal is fully depressed.

Of course, other user input that output other types of signals can be used and one skilled in the art is believed to be in position to adapt the user input management described herein according to the output control signal generated by the user input device.

The control unit 108, using data from the transmission 18 and the speed sensors 104 and 106, determines if the rotational speed of the shaft of the ICE 12 should be limited. If this rotational speed should be limited, the control unit 108 also determines the maximal rotational speed and the corresponding voltage value of the signal to be sent to the ECU to reach this maximal rotational speed. This voltage value becomes the max point signal.

It is to be noted that should the control unit 108 determine that the rotational speed of the shaft of the ICE 12 does not have to be limited, i.e. that no clipping is required, the max point signal is gradually returned to its default value of 4.5 volts if it was not at that default value already.

The control unit 108 supplies the max point signal to the software clipping module 110 that compares the max point signal to the signal from the user input 16 and outputs the smaller of these two signals to the hardware clipping module 112. As stated in its name, the software clipping module is software based and may thus be part of the control unit 108.

The hardware clipping module 112 receives the signal from the software clipping module 110 and compares it to the signal from the acceleration pedal and outputs the smaller of these two signals to the ECU 14. The hardware clipping module 112 may therefore be viewed as a hardware redundancy of the software clipping module 110.

As will be apparent to one skilled in the art, if the control unit 108 determines that the user input control signal should be clipped to a predetermined value to limit the rotational speed of the shaft of the ICE 12, it supplies the max point signal to be compared to the actual user input control signal by both redundant software and hardware modules and the user signal is clipped to the control value if it is higher. If the control signal from the user input is lower than the max point signal, no change is made to this signal. If the control unit 108 determines that no clipping is required, it sets, or gradually returns, the max point signal to the highest possible value of the user input control signal and therefore the control signal is not clipped.

A drivetrain 200 according to a second illustrative embodiment will be briefly described with reference to FIG. 4. In this drivetrain 200, the transmission is in the form of a Continually Variable Transmission 202 (hereinafter "CVT") and various elements have been added to the drivetrain. The drivetrain 200 therefore further includes a master clutch 204, downstream from the ICE 201, a torque-control clutch 206 downstream from the CVT 202, a hi/low gear selection 208 and a forward/reverse gear selection 210. All these elements are connected to the control unit 108' of the controller 102' to be controlled thereby and to supply data thereto. Of course, the first and second speed sensors 212 and 214 provide speed data to the control unit 108'.

Generally stated, CVTs are well known transmission mechanisms that can change through an infinite number of gear ratios between upper and lower limits. Toroidal CVTs, which are also well known, include a disk and roller arrangement that transmits power between the disks, wherein one disk is the input and the other disk is the output. Such a transmission is generally used when transmission ratios have to be finely adjusted.

Figure 4:
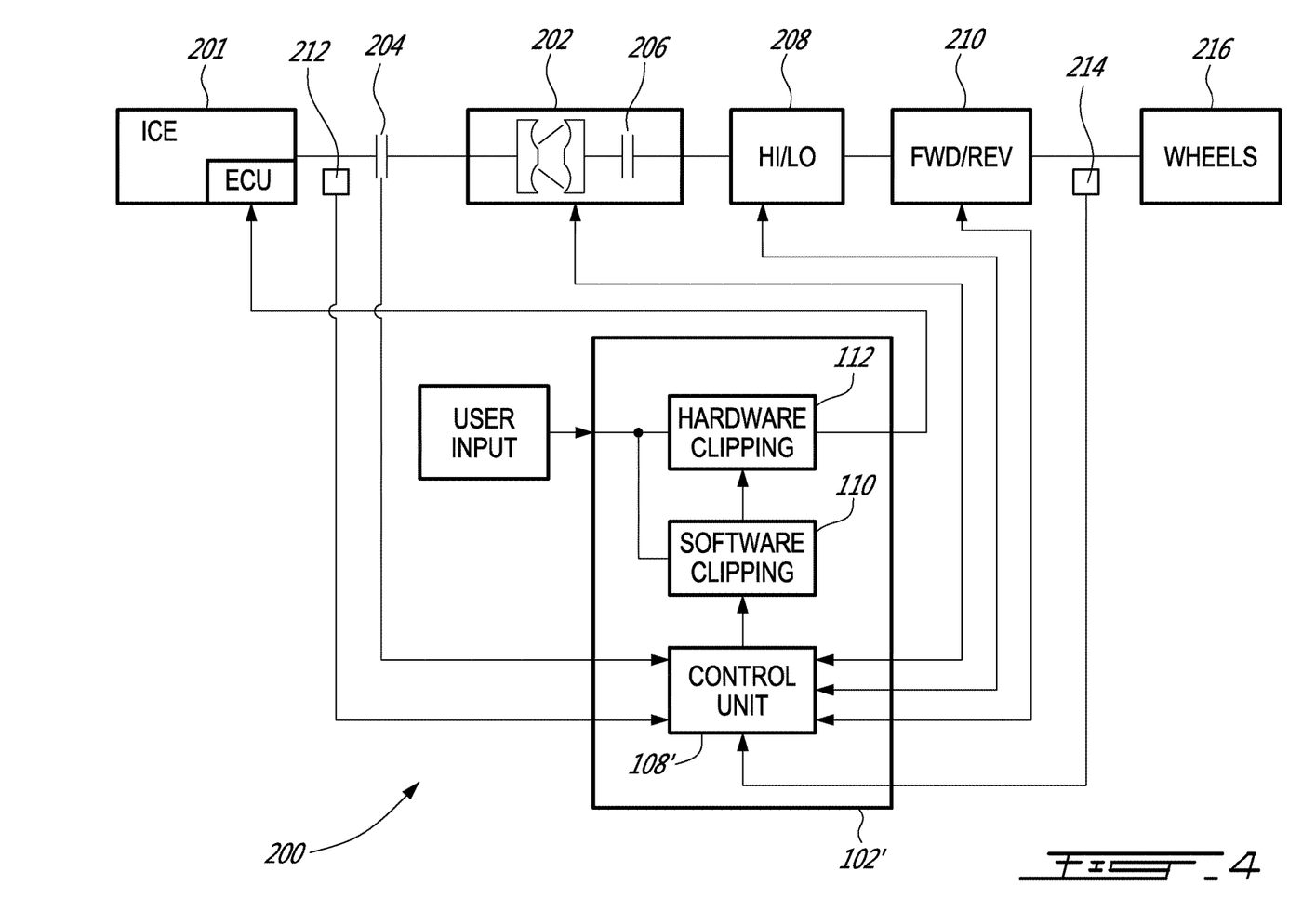
FIG. 4 is a schematic bloc diagram illustrating a drivetrain architecture according to a second illustrative embodiment allowing the management of the user input signal.

The operation of the drivetrain 200 of FIG. 4 is similar to the operation of the drivetrain of the previous figures. However, the controller 102' receives data from more sources and can be configured to take decisions regarding the maximal ICE rotational speed from this received data.

As a non-limiting example, the torque control clutch 206 is so controlled to allow a predetermined and controllable maximal torque to pass therethrough and to slip should a torque greater than this maximal torque attempts to pass through the clutch 206. Should the clutch 206 start slipping, this information is supplied to the controller 102' and the max point signal can be set accordingly. Indeed, since the torque-control clutch 206 is slipping, there is no reason to further increase the rotation speed of the shaft of the ICE. The controller 102', knowing the rotation speed of the output shaft of the ICE via the speed sensor 212 determines a max point signal so that this rotation speed does not increases while the clutch 206 is slipping.

Similarly, since the controller 102' obtains data from the drivetrain elements such as the CVT 202, the hi/low gear selection 208 and the forward/reverse gear selection 210, it knows the transmission ratio between the speed of the output shaft of the ICE 201 and the wheels 216. Knowing the measured rotational speed of these elements, thanks to the speed sensors 212 and 214, it can determine if any element of the drivetrain is slipping and adapt the max point signal accordingly to prevent the increase of the rotation speed of the output shaft of the ICE 201 while something in the drivetrain is slipping. Furthermore, since the controller 102' receives data from other source, such as, for example, the CVT 202, the clutch 204 and the selection mechanisms 208 and 210, it can make decisions concerning the rotational speed of the ICE 201 that should not be exceeded and take appropriate measures.

While the description above refers to a redundant hardware and software clipping determination running in series, one skilled in the art will understand that this redundancy is not always required and that only one or the other could be used, or that their order could be reversed. Accordingly, the beneficial use of both software and hardware clipping units is to be considered as optional.

Figure 5:
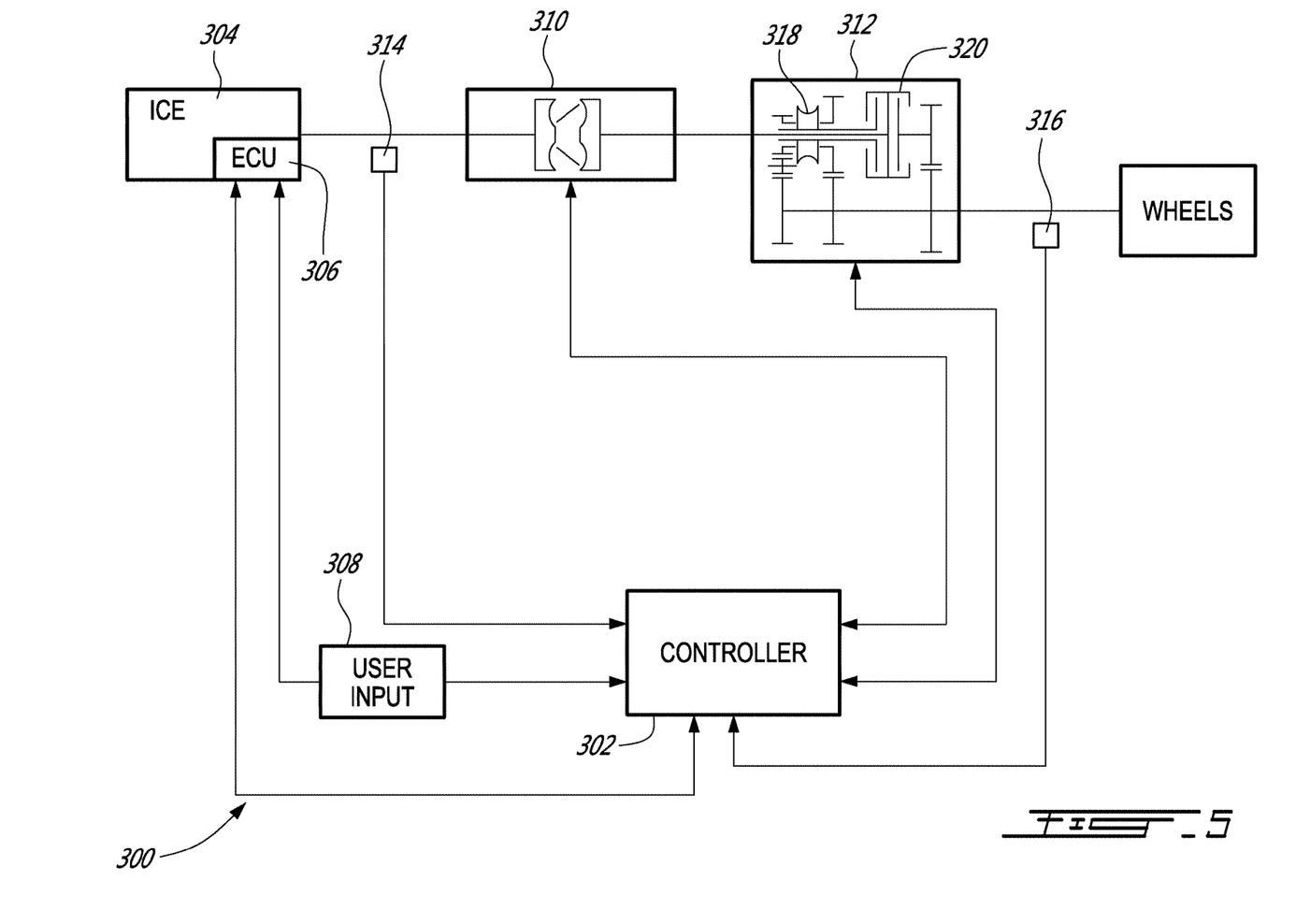
FIG. 5 is a schematic bloc diagram similar to FIG. 4 but illustrating a third embodiment.

Turning now to FIG. 5 of the appended drawings, a drivetrain 300 according to a third illustrative embodiment will be described. The drivetrain 300 includes a controller 302, a prime mover in the form of an ICE 304 provided with an ECU 306, a user input 308, a primary transmission in the form of a CVT 310, a secondary transmission 312 and input and output rotary speed sensors 314 and 316.

In this embodiment, the controller 302 does not have hardware or software clipping mechanisms and the ICE 304 is an engine that includes a CAN bus interface to its ECU 306. This CAN bus interface uses standard messages, for example under the SAE J1939 standard.

As is clear from FIG. 5, the ECU 306 includes two inputs. A first input receives a control signal from the user input 308 while a second input receives a max point signal from the controller 302 through the CAN bus interface as will be described hereinbelow.

The secondary transmission 312 is a forward reverse, hi-low transmission including a dog clutch 318 and a three-position friction clutch 320. The three-position clutch 320 further acts as the torque-control clutch 206 of FIG. 4.

The controller 302 determines a max RPM of the ICE 304 depending on the data representing various conditions of the vehicle obtained via the various sensors and components connected to the controller 302. This max RPM value, as a max point signal, is supplied to the ECU 306 of the ICE 304 via the CAN bus interface according to the SAE J1939 standard. The ECU 306 can therefore be viewed as controlling the ICE 304 according to the lesser value between the control signal from the user input 308 and the max point signal from the controller 302. The maximal RPM of the ICE is therefore set to the max point signal notwithstanding the value of the control signal. In other words, the control signal from the user input is therefore clipped when it is higher than the max point signal supplied by the controller 302.

One skilled in the art will understand that the controller 108, 108' or 302 can be configured so that clipping of the user input is performed when specific conditions happen.

Here are some non-limiting examples of specific conditions that may lead to pedal clipping, i.e., to the limitation of the user input control signal by the max point signal supplied to the ICE by the controller.

The slipping of a transmission component such as a clutch, for example, when the vehicle starts from standstill. Indeed, when the vehicle starts from a standstill and the accelerator control signal causes the output shaft of the ICE to rotate at high speed, some elements of the transmission may slip, which is detrimental to the lifespan of the spinning element and which is wasteful with respect to the fuel consumption of the ICE. Therefore, in one illustrative configuration of the controller 108, 108' or 302, to prevent the high speed revving of the ICE in this specific condition, the slipping of the transmission components are monitored and, when slipping is detected and supplied to the controller, the max point signal is set so that the maximal RPM of the ICE is at a value where the ICE develops its peak torque.

Another specific condition arises when a transmission component such as a clutch, for example, begins slipping during the switch from forward movement to reverse movement, or vice versa, or when the hi-low operational range is changed. Again, when one of these conditions occurs, rotating the shaft of the ICE at high speed is not adequate and is prevented by monitoring the slipping condition of the clutches and by generating an appropriate max point signal.

As another non-limiting example of specific condition, it may be interesting to clip the control signal when a predetermined vehicle speed must not be exceeded, i.e. when a speed limiter is used. Indeed, when a speed limiter is used with a drivetrain including a CVT, it is interesting to upshift the transmission as much is possible with respect to the desired speed, and to have an as low of possible rotation speed of the shaft of the ICE to thereby improve fuel consumption. In this specific condition, it is interesting to limit the rotational speed of the shaft of the ICE by clipping the user input control signal and to control the CVT accordingly. Accordingly, the controller upshifts the CVT to reach the speed limit and thereby decreases fuel consumption.

It is to be noted that the drivetrains 200 and 300 are so configured that is it possible, for a range of ground speed of the vehicle, to configure the controller to keep the ICE in its most efficient RPM and to vary the CVT ratio according to the user input to thereby increase or decrease the speed of the vehicle while the ICE maintains its best fuel efficiency. Many ICEs have sensors that allow them to determine their load. In the event that the load is low and that the user input requires a speed increase, the controller can upshift the CVT ratio instead of increasing the speed of the output shaft of the ICE.

Of course, while a portion of the above description is concerned with fuel efficiency, all these strategies also apply when a power source other than fuel is used.

While the above disclosure refers to an accelerator pedal, one skilled in the art will understand that other input devices could be used instead of an accelerator pedal.

Similarly, while the position of the user input is referred herein as the determining factor of the intent of the user, other user input (not shown) could generate a control signal using other factors not related to the position of an object. As a non-limiting example, should the user input being a numerical keyboard, the entered number could be used to generate a control signal. For concision purpose, the term "position" is used herein to convey the intent of the user.

It is to be understood that the user input signal management in a vehicle is not limited in its application to the details of construction and parts illustrated in the accompanying drawings and described hereinabove. The user input signal management in a vehicle is capable of other embodiments and of being practiced in various ways. It is also to be understood that the phraseology or terminology used herein is for the purpose of description and not limitation. Hence, although the user input signal management in a vehicle has been described hereinabove by way of illustrative embodiments thereof, it can be modified, without departing from the spirit, scope and nature thereof.

What is claimed is:

1. A user input signal management method for a vehicle provided with a drivetrain including a prime mover having an output that rotates and an input that controls a rotating speed of the output of the prime mover, the drivetrain further including a user input, the method comprising:
   receiving a user input control signal representative of a position of the user input of the vehicle;
   receiving data representative of at least one condition of the vehicle;
   generating a max point signal as a function of the data received;
   determining a lesser signal of the control signal and the max point signal; and
   supplying the lesser signal to the input of the prime mover.

2. The method as recited in claim 1, wherein the receiving data representative of at least one condition of the vehicle step includes receiving data from at least one element of the vehicle selected from a group including a speed sensor of the output of the prime mover, a speed sensor of wheels of the vehicle, a transmission of the vehicle, and a torque-control clutch of the vehicle.

3. The method as recited in claim 1, wherein the receiving data representative of at least one condition of the vehicle step includes receiving data representative of slippage of any elements of the drivetrain of the vehicle.

4. The method as recited in claim 1, wherein the lesser signal determining step is done via a combination of a software method and a hardware method and wherein results from the combination are compared before the supplying of the lesser signal to the input of the prime mover step.

5. A user input signal management method for a vehicle provided with a drivetrain including a prime mover having an output that rotates and an Engine Control Unit (ECU) having first and second inputs, the vehicle also including a user input, the method comprising:
   supplying a user input control signal representative of a position of the user input of the vehicle to the first input of the ECU;
   receiving data representative of at least one condition of the vehicle;
   generating a max point signal as a function of the data received; and
   supplying the max point signal to the second input of the ECU;
   wherein the prime mover rotates the output at a speed that is a function of a lesser signal of the user input control signal and the max point signal.

6. The method as recited in claim 5, wherein the receiving data representative of at least one condition of the vehicle step includes receiving data from at least one element of the vehicle selected from a group including a speed sensor of the output of the prime mover, a speed sensor of wheels of the vehicle, a transmission of the vehicle, and a torque-control clutch of the vehicle.

7. The method as recited in claim 5, wherein the receiving data representative of at least one condition of the vehicle step includes receiving data representative of slippage of any elements of the drivetrain of the vehicle.

8. A drivetrain for a vehicle provided with a user input including an output configured to generate a control signal representative of a position of the user input, the drivetrain comprising:
   a prime mover provided with an output and with an Electronic Control Unit (ECU) having an input; the ECU configured to rotate the output of the prime mover at a speed that is a function of a signal received at the input thereof; and
   a controller having an input connected to the output of the user input to receive the control signal therefrom, at least another input allowing vehicle condition data to be supplied to the controller; the controller configured to generate a max point signal as a function of the vehicle condition data; the controller having an output connected to the input of the ECU of the prime mover; the controller being so configured as to supply a lesser of the control signal and the max point signal to the user input of the ECU.

9. The drivetrain as recited in claim 8, further comprising:
   a transmission having an input connected to the output of the prime mover and an output rotating at a speed that is a function of a transmission ratio; the transmission connected to the controller to supply an instantaneous transmission ratio thereto as the vehicle condition data and to receive a target transmission ratio from the controller; the controller configured to maintain a rotation speed of the output of the prime mover and to modify the target transmission ratio sent to the transmission as a function of the control signal.

10. The drivetrain as recited in claim 9, further comprising:
a speed sensor of a wheel of the vehicle supplying vehicle speed data to the controller which is configured to determine a transmission ratio required to maintain a predetermined vehicle speed and to supply the determined transmission ratio to the transmission as the target transmission ratio.

11. The drivetrain as recited in claim 9, wherein the transmission is a continuously variable transmission.

12. The drivetrain as recited in claim 8, further comprising:
a torque-control clutch connected to the controller to be controlled therefrom and to send the vehicle condition data thereto; the torque-control clutch configured to allow a predetermined and controllable maximal torque to pass through; the torque control-clutch configured to slip should a torque greater than the maximal torque attempt to pass through; the torque-control clutch configured to supply slipping data to the controller that generates the max point signal as a function of the torque-control clutch slipping data.

13. The drivetrain as recited in claim 8, wherein the prime mover is an internal combustion engine.

14. A drivetrain for a vehicle provided with a user input so configured as to generate a control signal representative of a position of the user input, the drivetrain comprising:
a prime mover provided with an output and with an Electronic Control Unit (ECU) having first and second inputs; the first input receiving the control signal from the user input; and
a controller having at least one input allowing vehicle condition data to be supplied to the controller; the controller configured to generate a max point signal as a function of the vehicle condition data; the controller supplying the max point signal to the second input of the ECU; the prime mover configured to rotate the output of the prime move at a speed that is a function of a lesser of the control signal and the max point signal.

15. The drivetrain as recited in claim 14, wherein the controller includes an input connected to an output of the user input so as to receive the control signal therefrom.

16. The drivetrain as recited in claim 15, further comprising:
a transmission having an input connected to the output of the prime mover and an output rotating at a speed that is a function of a transmission ratio; the transmission connected to the controller to supply an instantaneous transmission ratio thereto as the vehicle condition data and to receive a target transmission ratio from the controller; the controller being so configured to maintain a rotation speed of the output of the prime mover and to modify the target transmission ratio sent to the transmission as a function of the control signal.

17. The drivetrain as recited in claim 16, further comprising:
a speed sensor of a wheel of the vehicle supplying vehicle speed data to the controller the controller configured to determine a transmission ratio required to maintain a predetermined vehicle speed and to supply the determined transmission ratio to the transmission as the target transmission ratio.

18. The drivetrain as recited in claim 16, wherein the transmission is a continuously variable transmission.

19. The drivetrain as recited in claim 14, further comprising:
a torque-control clutch connected to the controller to be controlled therefrom and to send the vehicle condition data thereto; the torque-control clutch configured to allow a predetermined and controllable maximal torque to pass through, the torque-control clutch to slip should a torque greater than the maximal torque attempt to pass through; the torque-control clutch configured to supply slipping data to the controller that generates the max point signal as a function of the torque-control clutch slipping data.

20. The drivetrain as recited in claim 14, wherein the prime mover is an internal combustion engine.

* * * * *